(12) United States Patent
Powell

(10) Patent No.: US 10,852,257 B2
(45) Date of Patent: Dec. 1, 2020

(54) METHOD AND APPARATUS FOR THE INSPECTION OF CONTAINED MATERIALS

(71) Applicant: Kromek Limited, Sedgefield (GB)

(72) Inventor: Andrew Keith Powell, Sedgefield (GB)

(73) Assignee: Kromek Limited, Sedgefield (GB)

( * ) Notice: Subject to any disclaimer, the term of this patent is extended or adjusted under 35 U.S.C. 154(b) by 0 days.

(21) Appl. No.: 15/024,284

(22) PCT Filed: Oct. 28, 2014

(86) PCT No.: PCT/GB2014/053198
§ 371 (c)(1),
(2) Date: Mar. 23, 2016

(87) PCT Pub. No.: WO2015/063464
PCT Pub. Date: May 7, 2015

(65) Prior Publication Data
US 2016/0238543 A1 Aug. 18, 2016

(30) Foreign Application Priority Data
Oct. 28, 2013 (GB) .................................. 1318998.0

(51) Int. Cl.
*G01N 23/10* (2018.01)
*G01V 5/00* (2006.01)
*G01N 23/083* (2018.01)

(52) U.S. Cl.
CPC ........... *G01N 23/10* (2013.01); *G01V 5/0016* (2013.01); *G01N 23/083* (2013.01);
(Continued)

(58) Field of Classification Search
CPC ....... G01N 2223/402; G01N 2223/643; G01N 23/087; G01N 23/10; G01N 2223/305;
(Continued)

(56) References Cited

U.S. PATENT DOCUMENTS 8,537,968 B2 9/2013 Radley
2006/0008046 A1* 1/2006 Ruhrnschopf ......... A61B 6/032
378/7
(Continued)

FOREIGN PATENT DOCUMENTS

EP 2696196 A1 2/2014
WO WO-2008020886 A2 2/2008
(Continued)

OTHER PUBLICATIONS

Couteau, Olivier, "International Search Report," prepared for PCT/GB2014/053198, dated Jan. 20, 2015, five pages.

*Primary Examiner* — Kyle R Quigley
(74) *Attorney, Agent, or Firm* — Shackelford, Bowen, McKinley & Norton, LLP

(57) ABSTRACT

A method for the inspection of contained flowable materials within containers, such as detecting an explosive liquid in a luggage, and an apparatus for performing the method are described. The method includes the steps of: performing a radiation scan, using X-rays or Gamma rays, of a target item container of contained flowable material in a radiation scanning system to derive a spatially distributed and spectroscopically resolved measured dataset of the intensity of radiation emergent from the target item; considering the spatially distributed and spectroscopically resolved dataset of transmitted radiation intensity to be nominally determined in accordance with a relationship: $[O]\cdot[\delta]=[\lambda]$ where the operators $[\delta]$ and $[\lambda]$ define, respectively, physical parameters describing the liquid and the container and the system response and the operator $[O]$ defines the relationships between the system response and the liquid and container parameters; numerically processing the measured dataset by operator inversion in order to derive a best fit solution of:

(Continued)

$[\delta]=[O]^{-1}\cdot[\lambda]$; and using that derived solution to determine the threat status of the target item.

16 Claims, 4 Drawing Sheets

(52) U.S. Cl.
CPC . *G01N 2223/305* (2013.01); *G01N 2223/636* (2013.01); *G01N 2223/637* (2013.01); *G01N 2223/638* (2013.01); *G01N 2223/639* (2013.01); *G01N 2223/643* (2013.01)

(58) Field of Classification Search
CPC ....... G01N 2223/636; G01N 2223/637; G01N 2223/638; G01N 2223/639; G01V 5/0016
See application file for complete search history.

(56) References Cited

U.S. PATENT DOCUMENTS

| | | | |
|---|---|---|---|
| 2006/0045235 A1* | 3/2006 | Bruder | A61B 6/032 378/9 |
| 2006/0133566 A1* | 6/2006 | Li | G01N 23/20066 378/57 |
| 2008/0043917 A1* | 2/2008 | Oreper | G01V 5/0025 378/116 |
| 2011/0116605 A1* | 5/2011 | Radley | G01N 23/087 378/162 |
| 2013/0101156 A1 | 4/2013 | Holt | |
| 2013/0148873 A1* | 6/2013 | Arenson | G06T 11/005 382/132 |

FOREIGN PATENT DOCUMENTS

| | | |
|---|---|---|
| WO | WO-2009024818 A1 | 2/2009 |
| WO | WO-2012114199 A2 | 8/2012 |

\* cited by examiner

METHOD AND APPARATUS FOR THE INSPECTION OF CONTAINED MATERIALS

This invention relates to a method and apparatus for the inspection of contained materials such as liquids and the like, especially within containers.

The invention in particular relates to objects comprising containers of contained materials which by their nature will be expected to have a single generally homogeneous composition, for example fluid compositions such as liquids, including mixtures, solutions, emulsions, suspensions etc, like flowable compositions such as gels, pastes, creams, fine powders, and the like, aerosols etc. Where reference is made herein by example to contained liquids in objects such as liquid containers it should be appreciated that the invention is equally applicable to all such liquid, partly-liquid and other flowable materials having this essential mixed and generally homogeneous character when contained.

The invention particularly relates to an apparatus and method making use of high energy radiation such as x-rays or gamma-rays to scan objects where it is desirable to gain information about the internal contents and/or composition of the contained material.

The invention is particularly useful in relation to use in a security or like situation for the detection of contraband liquid materials, for example explosives or other dangerous or prohibited materials. A particularly significant example of such used is in the screening of airline baggage for explosives. The invention is discussed below by way of example in such a context. However the invention is not limited to security applications but can be applied in all circumstances where it might be desirable to gain information about the internal contents and/or composition of a contained liquid or liquid sample, for example for identification purposes, for stock control or quality control purposes, to monitor changes and especially degradation over time, and other applications.

It is desirable to scan the contents of objects such as, for example bottles, at security and customs checkpoints to gain information about content based on radiation received at a detector after interaction with the object and obtain an indication that the contents of the object do not constitute a threat to security or a breach of customs regulations. It is also desirable to scan the contents of objects for other purposes such as quality control, content verification, degradation monitoring etc.

To ensure that the contents of an object are what they are claimed to be, it may be useful to scan the object and contents so that a high energy ionising radiation beam traverses a cross section of the object. It can be possible to obtain an indication of the materials composition from a numerical analysis of the resultant transmitted radiation beam intensity data and to compare the results of that analysis with a reference data set relating to materials properties.

The transmission of x-rays through a material can be given by the exponential attenuation law for a particular energy, as follows:

$$I/I_o = \exp[-(\mu/\rho)\rho t] \quad (1)$$

where $\mu/\rho$=Mass attenuation coefficient. A material constant which is characteristic of the weighted elemental composition of a material;
I=final intensity;
$I_0$=Initial intensity;
$\rho$=density of the material; and
t=thickness of the material.

Thus by looking at the variation in the x-ray transmission as a function of changes in the thickness "t" of a material, for example, deductions can be made about the mass attenuation coefficient and the density of the material. These two parameters are characteristic of different materials and so materials identification becomes possible.

Instrumentation has been developed which is intended to non-invasively identify target liquids and like materials (that is, materials having similarly generally homogenous composition throughout) held within sealed containers. The target liquids or like materials may be liquids or like materials which pose a security threat if carried on-board an aircraft, liquids containing dissolved narcotics, or liquids requiring quality control, for example. According to techniques disclosed in International Patent Application No. PCT/GB2008/050711 (Publication No. WO2009/024818), a container may be irradiated with a beam of x-rays and the transmission response of the container and its liquid or like contents measured using an energy selective detector such as cadmium telluride or germanium. The transmission characteristics of various contained materials held in a variety of containers could be recorded and held in a database. The database could then be used for comparison with in situ scanning of containers and contents to look for matched transmission characteristics in the database.

When the object being scanned is a contained material which by its nature will be expected to have a single generally homogeneous composition, for example being a fluid composition such as a liquid as above described in a container, the analysis problem is potentially simplified when compared with scanning of inhomegeneous objects or packaging containing multiple objects by the expected homogeneity of the contained material and the container itself. Even so both the contained material and the container itself are subject to individual component variables, such as: the type of contained material, the composition or concentration of a contained material, the path length of high energy ionising radiation in the contained material, the material from which the container is made, and the thickness of the wall of the container, for example.

To enable these to be resolved when the radiation data collected from transmission through the container and its liquid or like contents is processed, and in particular to minimize complications attributable to fill level of partly filled bottles, irregular bottle shape and the like, known systems embodying the principles above described have been developed in which a bottle is scanned by being held in a fixed position and a scan performed through bottle and contents in a controlled manner using for example a simple pencil beam.

The fixed relationship and the simple beam geometry reduce unnecessary variable complexity in the transmission data and simplify its processing to resolve compositionally useful information about the contents. However the individual and discrete nature of the scanning operation reduces throughput as each bottle or other container must be placed in turn in the scanner.

More complex shapes, and objects or packaging containing multiple objects or components may be subject to a full 3D scan for imaging or other purposes using CT or other techniques to extract data resolved in three dimensions, but these require an additional level of data processing complexity whereby the advantages of the simple compositional analysis available as a result of the expected homogeneity of a bottle with liquid test object are not exploited.

An indispensable means of probing for objects that are concealed from normal view is to use X-rays and to measure their transmittance properties. While computed tomography scanners utilising X-rays in this way are an advanced technology, they are dependent on making a large compliment of precision sequential measurements (scans) in order to render the volume of an object so that it can be viewed and then be interpreted. This inevitably involves a large hardware and computing overhead and is ultimately limited to the resolution of the system, its calibration, the artefacts that are inherent to the tomography method and any interpretation subsequently applied.

Techniques based on pattern recognition/image processing have been developed to identify threat liquids using X-rays, for example as illustrated in EP2696196. X-ray image data derived by performing an X-ray scan at a security checkpoint is secondarily processed to determine a threat status based on certain determined image characteristics such as fill level. Whilst pattern recognition/image processing methods have a role in the automated interpretation of images captured in such a way, they require a secondary processing stage with one or more sequential image related processing type operations and steps, applied to each measured data point. This multiple stage processing takes time and affects throughput rates and accuracy.

It is desirable to develop a scanning protocol and apparatus which mitigates some or all of the above disadvantages of existing contained liquids composition scanners and in particular which continues to exploit the data processing compositional analysis techniques available as a result of the expected homogeneity of a bottle with liquid test object and in particular which is better able to deal with multiple bottle shapes, orientations and fill levels but without requiring the complexity of a full 3D scan.

It is particularly desirable to develop a scanning protocol and apparatus which confers a faster throughput rate. It is particularly desirable to develop a scanning protocol and apparatus that is readily adaptable to existing systems with reduced additional footprint and/or cost. It is particularly desirable to develop a scanning protocol and apparatus that maintains a low false alarm rate.

In accordance with the invention in a first aspect, a method is provided for the inspection of contained flowable materials such as liquids and the like within containers comprising:

performing a radiation scan of a target item container of contained flowable material in a radiation scanning system to derive a spatially distributed and spectroscopically resolved measured dataset of the intensity of radiation emergent from the target item;

considering the spatially distributed and spectroscopically resolved dataset of transmitted radiation intensity to be nominally determined in accordance with a relationship:

$$[O]\cdot[\delta]=[\lambda]$$

where $\delta$ is a notional theoretical set of elements related to parameters inherent in a target item that characterise the scanning response of the target item, $\lambda$ is a system response vector in space and energy comprising the spatially distributed and spectroscopically resolved radiation intensity response produced by a target item, and O is a space and material derived operator, which projects vector $\delta$ on to the scanning system response vector $\lambda$;

numerically processing the measured dataset in order to derive a best fit solution of:

$$[\delta]=[O]^{-1}\cdot[\lambda]$$

using that derived solution to determine the threat status of the target item.

The method of the invention retrieves the information that is desired as a single step, acting on all of the captured data at once. This can be contrasted with prior art methods which have to proceed along a linear sequence of image related processing type operations and steps, applied to each measured data point. In the method of the invention, an image need not be generated and subjected to a series of image processing steps. The captured data can be processed in a single numerical step. This contrasts with the referenced prior art that specifically recognises the image processing as requiring further separated and necessary steps.

The invention relies upon an appreciation that the scanning system response to a target item is the outcome of the collective contribution of a set of stimuli in the target item that characterise the scanning response of the target item, comprising a set of parameters characteristic of the target item container that affect its transmission response in the scanning system. Such target item parameters include without limitation for example container position, extent, shape, wall thickness, and material responses; and contents material type, fill level etc.

However the method of the invention is distinctly characterised in that these are not measured as such. Rather, the notional contribution of a notional set of such stimuli is analysed in accordance with the nominal relationship:

$$[O]\cdot[\delta]=[\lambda]$$

where in the most general case O (space, material) is a space and material derived operator, which projects values for a vector $\delta$, that represents elements related to parameters inherent in the target item that characterise the scanning response of the target item on to a corresponding range of possible measurements of system response $\lambda$ (space, energy) dimensioned in space and energy of the configured scanning system. The energy dependent measures and material description are related through the material basis decomposition or transform of coefficients and are contained within O.

The operator O (space, material) is thus characteristic of the configured scanning system. In a general sense, it is a representation of a calibration of the scanning system. It is in principle the system defined operator which will in accordance with the first equation hereinabove project any set of values of vector $\delta$ onto a corresponding system response $\lambda$.

In principle, an operator O may be defined for a given configured scanning system and for a given predetermined set of elements postulated for vector $\delta$. In practice therefore, the method of the invention requires, in a step prior to scanning of target objects, a prior step in which a representative operator O (space, material) is constructed for the configured scanning system for a pre-determined set of elements defined for vector $\delta$.

That is to say, the step of considering the spatially distributed and spectroscopically resolved dataset of transmitted radiation intensity to be nominally determined in accordance with a relationship:

$$[O]\cdot[\delta]=[\lambda]$$

as defined in accordance with the first aspect of the invention includes a step of constructing a representative operator O (space, material) for the configured scanning system for a pre-determined set of elements defined for vector $\delta$.

Alternatively stated, the invention comprises in a further aspect a method for the inspection of contained flowable materials such as liquids and the like within containers in a radiation scanning system comprising the steps of:

constructing for the configured scanning system for a pre-determined set of elements defined for a vector δ a representative operator O (space, material) in accordance with the relationship:

$$[O] \cdot [\delta] = [\lambda]$$

where δ is a notional theoretical set of elements related to parameters inherent in a target item that characterise the scanning response of the target item, λ is a system response vector in space and energy comprising the spatially distributed and spectroscopically resolved radiation intensity response produced by a target item, and O is a space and material derived operator, which projects vector δ on to the scanning system response vector λ;

performing a radiation scan of a target item container of contained flowable material in a radiation scanning system to derive a spatially distributed and spectroscopically resolved measured dataset of the intensity of radiation emergent from the target item;

numerically processing the measured dataset in order to derive a best fit solution of:

$$[\delta] = [O]^{-1} \cdot [\lambda]$$

using that derived solution to determine the threat status of the target item.

The step of construction of an operator O in accordance with the principles of the invention is thus for practical purposes in the general sense a calibration step performed on the configured scanning system prior to the scanning of target objects. An operator O may be constructed in accordance with the principles of the invention for a given set of stimuli making up the elements of the vector δ in accordance with suitable principles including known principles which may include experimental calibration with a standard object of certain known parameters which may be a container of the type to be scanned for threat assessment or another standard object and/or numerical calibration against theoretical standard parameters for example using a Monte Carlo simulation.

The performance of the calibration step of the invention lies in the breaking down the process of generation of the system response λ conceptually in accordance with the relationship $[\delta] = [O]^{-1} \cdot [\lambda]$. Once presented with this concept, the selection of of a suitable range of appropriate stimuli as elements of the vector δ and hence of appropriate target object parameters becomes a matter of system design dependent upon the particular system requirements and generally within the competence of the skilled person. The determination of an appropriate experimental and/or numerical method to construct a suitable operator O corresponding to such a set of stimuli as elements of the vector δ can be made by selection from routine techniques and in particular experimental and/or numerical calibration techniques within the general knowledge of the skilled person.

The method of the invention involves in a scanning step performing a radiation scan of a target item container of contained flowable material in a radiation scanning system to derive a spatially distributed and spectroscopically resolved measured dataset of the intensity of radiation emergent from the target item. The spatially distributed and spectroscopically resolved measured dataset of the intensity of radiation emergent from the target item thus constitutes a measured system response λ (space, energy) dimensioned in space and energy of the configured scanning system to the unknown target item.

The method of the invention involves in a fitting step a process of fitting the spatially distributed and spectroscopically resolved measured dataset to acquire a best fit solution and in particular the single, best solution of:

$$[\delta] = [O]^{-1} \cdot [\lambda]$$

As the spatially distributed and spectroscopically resolved measured dataset comprises a measured λ it is possible to infer, from unfolding the action of the pre-constructed O, what values of the stimuli δ would correspond to the measured system response λ (space, energy) and would produce the measured system response λ (space, energy) under action of the system-determined operator O (space, material). From this numerically derived δ an inference can be drawn of the threat level of a container (or just its contents).

It can be noted that the number of elements of λ will be significantly greater than the number of elements of δ. We can thus consider δ as a compressed representation of λ by the operation of, O, the system response operator. It is this process that is inherently noise, and error mitigating for the noise levels associated with each constituent measure of λ is no longer directly pertinent to an analysis of δ in accordance with the principles of the invention.

As the method does not rely on extracting per se measurements of the container relating to its position, the shape, a fill level, X-ray path lengths and contents for example, it is not prone to the statistical uncertainties of such measurements and their knock-on consequences in subsequent outcome reporting in the way that prior art methods requiring per se image processing are. The goal is primarily not to know the exact dimension and size and shape of a scanned item but to use the derived single, best solution of δ derived from the inverse of the response $O^{-1}$ and the use of this derived solution to determine the threat status of the container or contents.

As the method does not rely on determining single data elements in isolation but rather the role that each plays along with all other measured data elements in substantiating conjectures made about the scanned item, there are significant positive implications regarding the effects of noise processes on overall system performance, which no longer become swamped by noise levels associated with individual pixels.

The lack of reliance on any single measured value not only desensitises the system response to noise but also to drifts in calibration and missing data due to hardware failure as robust missing data estimation can be undertaken. This contrasts to prior art whereby defective detector pixels, for example, would be compensated for, at best, by averaging values from adjacent pixels having possible critical detrimental effects on the subsequent data analysis. In translated or scanned system, such pixel defects would cause strips of inaccurate or imprecise data passed through the data processing stream.

The method of the invention is dependent upon calculating from a system output λ a set of stimuli δ, caused by the scanning of the target item. The response λ to these stimuli δ is expressed through a system operator O having been derived as discussed above. Thus the method is not dependent upon sequences of interdependent processing steps that rely upon spatially precise, calibrated and stable behaviours being generated for all the detector elements.

The method of the invention is dependent upon collecting scanning data by performing a radiation of a target item container of contained flowable material in a radiation scanning system to derive a spatially distributed and spectroscopically resolved measured dataset of the intensity of radiation emergent from the target item (container and where applicable contained flowable material) after radiation interaction with the scanning radiation and for example at least comprising radiation transmitted through the target item (container and where applicable contained flowable material). Radiation scanning systems capable of scanning target objects and resolving emergent radiation from the scanned objects spatially and spectroscopically will be generally familiar, and the precise configuration of apparatus and method to deliver the required spatially distributed and spectroscopically resolved measured dataset is not determinative of the invention.

Typically for example, a spatially distributed measured dataset of the intensity of radiation emergent from the target item may be obtained by the provision of at least one source and a plurality of spatially distributed separately addressable radiation detector elements arranged to define a scanning zone therebetween, and collecting from each of the plurality of separately addressable radiation detector elements a data item representative of radiation intensity incident upon the detection unit after interaction with the target object.

Radiation detector elements are for example distributed in at least two dimensions.

Radiation detector elements for example comprise one or more detector formations subdivided into plural separately addressable pixels in one or two dimensional arrays and/or one or more spatially distributed single pixel detectors.

Plural sources may be provided to give plural scanning radiation ray paths.

A spatially distributed measured dataset of the intensity of radiation emergent from the target item may be obtained by performing a first radiation scan in a first direction and second radiation scan in a second direction of a target item container of contained flowable material in a radiation scanning system, the second direction being at an angle to the first. The first and second radiation scans may be performed simultaneously or successively.

For example the method may comprise providing a first radiation source and a first radiation detector system spaced therefrom to define a scanning zone therebetween, the source being positioned to direct radiation in a first scanning direction through the scanning zone;

providing a second radiation source and a second radiation detector system spaced therefrom, the source being positioned to direct radiation in a second scanning direction through the scanning zone;

the second scanning direction being at an angle to the first;

causing an object to be scanned in the scanning zone and in particular to move relative to and through the scanning zone;

collecting radiation incident at each detector system after transmission through an object in the scanning zone.

The at least one detector system is preferably adapted to resolve radiation incident upon the detector spectroscopically into a plurality of energy bands and preferably at least three energy bands;

Typically for example, a spectroscopically resolved measured dataset of the intensity of radiation emergent from the target item may be obtained by the provision of a detector system capable of resolving spectroscopically radiation intensity incident upon the detector system after interaction with the target object.

For example at least some and preferably all of the detector elements of a plural set of spatially distributed separately addressable radiation detector elements as above defined are capable of resolving spectroscopically radiation intensity incident upon the detector element after interaction with the target object into a plurality of energy bands and preferably at least three energy bands.

The measurement of incident radiation at a detector element for example involves accumulating photon counts into spectral channels as generated by an energy selective detection system. For example this is done in a two stage process first in that it uses an energy selective detection system capable of accumulating photon counts in an energy discriminating manner and second in that appropriate processing electronics distributes this data into a plurality of energy bins representative of the overall transmitted intensity in each of a plurality of predefined energy bands. The detection system may comprise multiple detectors each responsive to a particular predefined energy band and/or a detector adapted to produce spectroscopic resolution inherently In accordance with the invention, collected data is resolved spectroscopically across at least two and preferably at least three and for example many energy bands within the spectrum of a scanning system and for example of the radiation source of the scanning system. Preferably, a detector element is composed of a material adapted to exhibit a spectroscopically variable response across at least a substantial part of the intended radiation spectrum in use. In particular a semiconductor material is used that exhibits inherently as a direct material property a direct variable electrical response and for example photoelectric response to different parts of the radiation spectrum in use. Further discussion of preferred materials follows in relation to the apparatus of the second aspect of the invention but will be understood to apply to the method by analogy.

The method if the invention returns a threat status. For example a threat status is a pass/fail response. For example a threat status is a threat category. For example a threat status further comprises an identification of the target item.

The method may further comprise displaying the threat status in any suitable manner.

The method of the invention is characterised in that all the response data is processed together by fitting numerically to a whole target response relationship. Single data elements are not processed separately. The power of the method lies in the way in which this allows the practitioner to reduce the effects of the noise processes associated with individual pixels on the overall system performance and on the threat level inferences drawn.

The method does this in effect by constructing the system response operator O, as illustrated by the example below, whereby target features such as where it is located in the scan region etc. are considered as the stimuli to the system from which the measured response arises. The inverse of the response $O^{-1}$ is found so that the stimuli that solve the above equation are inferred from the measurements by generating the vector $\delta$ from $\lambda$.

The method of the invention returns a threat status by making use of the inversion solution of the response $O^{-1}$ and thereby the derived vector $\delta$ and for example by comparing the same with a suitable data library for example of known threat material equivalents and/or known threat indicative parameters to within suitable confidence limits.

The invention lies conceptually in the realisation that it is not necessary to determine exact bottle measurements by processing data pixel by pixel using an image processing technique but instead the whole dataset approach of the invention can be followed to fit measured data to a fitted solution of $[\delta]=[O]^{-1} \cdot [\lambda]$ using an appropriately defined column vector $\delta$ comprising a notional theoretical set of elements related to parameters inherent in the target item that constitute stimuli for the scanning response of the target item. Subject to the appreciation of this concept, and of its fundamental difference from prior art methods involving direct metrology of the target item for example by image processing, the selection of a suitable range of appropriate stimuli as elements of the vector δ becomes a matter of system design dependent upon the particular system requirements and generally within the competence of the skilled person. The determination of an appropriate mathematical method to fit measured data to determine a fitted solution of $[\delta]=[O]^{-1}\cdot[\lambda]$ is a selection from routine techniques within the general knowledge of the skilled person.

For example, a suitable unconstrained, global, nonlinear optimisation procedure is used to find the most likely configuration of δ that would give rise to the measured data λ given the O as constructed for the configured scanning system. This is the essence by which O is inverted. It is also possible that the inversion gives rise to a number of possible vectors, due to low quality measurements, for example, but this situation is resolved by considering the best values that are consistent over multiple scans as a target is translated. For eaxmple the scan history may be used to select the best result from an ensemble of possibilities.

The sufficiency of the model that defines O and the success of the inversion process involving O and hence the quality of the solution δ can be assessed using standard statistical techniques. The sufficiency of O requires representative samples of scanned items with statistical noise generate stable values in δ from the measured (or simulated) data. An incomplete model or insufficient size of δ will prevent this. In addition, there are many ways that a cost function can be formulated (least squares etc.) that compares the system response to a derived set of stimuli and assesses the match of the measured data i.e. a solution quality measure.

Thus, the determination of the model in detail becomes an aspect of system design having regard to use requirements but not as such definitive of the inventive concept and comfortably within the competence of the skilled person once the concept itself is applied.

In accordance with the invention in a second aspect, an apparatus is provided for the scanning of contained materials such as liquids and the like within containers comprising:

a radiation scanning system comprising at least one radiation source and at least one radiation detector system spaced therefrom to define a scanning zone, the detector system being adapted to derive a spatially distributed and spectroscopically resolved measured dataset of the intensity of radiation emergent from a target item within the scanning zone;

a data storage module to store a spectroscopically resolved measured dataset of the intensity of radiation emergent from a scanned target item;

a numerical analysis module adapted to perform the following steps:

modelling the spatially distributed and spectroscopically resolved dataset of transmitted radiation intensity as nominally determined in accordance with a relationship:

$$[O]\cdot[\delta]=[\lambda]$$

where δ is a notional theoretical set of elements related to parameters inherent in a target item that characterise the scanning response of the target item, λ is a system response vector in space and energy comprising the spatially distributed and spectroscopically resolved radiation intensity response produced by a target item, and O is a space and material derived operator, which projects vector δ onto the scanning system response vector λ;

numerically processing the measured dataset in order to derive a best fit solution of:

$$[\delta]=[O]^{-1}\cdot[\lambda]$$

using that derived solution to determine the threat status of the target item.

The apparatus of the second aspect is in particular an apparatus adapted to perform the method of the first aspect, and preferred features will be understood by analogy.

In particular, the apparatus of the second aspect includes a radiation scanning system adapted to derive a spatially distributed and spectroscopically resolved measured dataset of the intensity of radiation emergent from a target item within the scanning zone.

Typically for example, the radiation scanning system may be adapted to derive a spatially distributed measured dataset of the intensity of radiation emergent from the target item in that it comprises at least one source and a plurality of spatially distributed separately addressable radiation detector elements arranged to define a scanning zone therebetween, and collecting from each of the plurality of separately addressable radiation detector element a data item representative of radiation intensity incident upon the detection unit after interaction with the target object.

The radiation detector elements are for example distributed in at least two dimensions and for example comprise one or more detector formations subdivided into plural separately addressable pixels in one or two dimensional arrays and/or one or more spatially distributed single pixel detectors.

Plural sources may be provided to give plural scanning radiation ray paths.

The radiation scanning system may comprise a first radiation source and a first radiation detector system spaced therefrom to define a scanning zone therebetween, the source being positioned to direct radiation in a first scanning direction through the scanning zone to be collected by the first radiation detector system after transmission through an object in the scanning zone;

a second radiation source and a second radiation detector system spaced therefrom, the source being positioned to direct radiation in a second scanning direction through the scanning zone to be collected by the second radiation detector system after transmission through an object in the scanning zone;

the second scanning direction being at an angle to the first;

wherein at least one of the detector systems is adapted to resolve radiation incident upon the detector spectroscopically into a plurality of energy bands and preferably at least three energy bands.

Typically for example, the radiation scanning system may be adapted to derive a spectroscopically resolved measured dataset of the intensity of radiation emergent from the target item in that it comprises a detector system capable of resolving spectroscopically radiation intensity incident upon the detector system after interaction with the target object.

For example at least some and preferably all of the detector elements of a plural set of spatially distributed separately addressable radiation detector elements as above defined are capable of resolving spectroscopically radiation intensity incident upon the detector element after interaction with the target object.

In accordance with the invention, collected data is resolved spectroscopically across at least two and preferably at least three and for example many energy bands within the spectrum of a scanning system and for example of the radiation source of the scanning system. Preferably, a detector element is composed of a material adapted to exhibit a spectroscopically variable response across at least a substantial part of the intended radiation spectrum in use. In particular a semiconductor material is used that exhibits inherently as a direct material property a direct variable electrical and for example photoelectric response to different parts of the radiation spectrum in use.

The apparatus is compatible with existing numerical analysis techniques developed for single beam scanners, such as described International Patent Application No. PCT/GB2008/050711 incorporated herein by reference. However, it relies on the realisation that effective parameterisation of irregularly shaped bottles at irregular angles and fill levels requires at least a dual view. Hence two detector systems are provided with scan directions at an angle to each other.

This simple dual view technology is sufficient, given the nature of the liquid or like materials and bottles or like containers being examined, to give a more powerful dataset that obviates the need for item-by-item stationary scans at known orientations. This requires a simple two view geometry, but not a full 3D image processing step such as a CT or other technique. The simple numerical techniques of the prior art are still available.

Throughput rates may be increased. Multiple items may be scanned, if not simultaneously a least immediately successively, for example as they are caused to pass through the scanning zone on a movable conveyor. Thus, the apparatus preferably comprises means to cause an object to move relative to and through the scanning zone in use for example comprising a movable conveyor such as endless belt conveyor.

To simplify the numerical processing the second scanning direction is preferably orthogonal to the first scanning direction.

In the preferred case, the apparatus comprises means to cause an object to move relative to and through the scanning zone in a movement direction, the first and second scanning directions are preferably orthogonal to the movement direction and more preferably additionally orthogonal to each other.

Each of the first and second radiation sources is preferably adapted to generate a two dimensional beam such as a fan beam or a curtain beam and/or each of the first and second detector systems in preferably a linear array detector.

Each radiation source is for example a source of high-energy radiation such as ionizing radiation, for example high energy electromagnetic radiation such as x-rays and/or gamma rays, or subatomic particle radiation, and the detector is adapted correspondingly to detect radiation in this spectrum. The radiation source for example is a broadband source such as a broadband x-ray or gamma-ray source capable of producing broad spectrum emission over a wide range of energies. The detector system preferably exhibits a spectroscopically variable response across at least a part of the source spectrum allowing spectroscopic information to be retrieved and allowing intensity information to be detected at a plurality of differentiated energy bands across the spectrum of the source.

At least one of the detector systems is adapted to resolve radiation incident upon the detector spectroscopically into a plurality of energy bands and preferably at least three energy bands. Optionally both of the detector systems are so adapted. Alternatively one of the detector systems may be a dual or multispectral system and the other may be a dual or single energy system. The use of dissimilar detectors may be advantageous to exploit different properties. Dissimilar detectors for the two projections might for example allow a high spatial resolution low cost mono-energetic or dual energy system in one projection and a multi-energy system in another projection not necessarily needing the same spatial resolution.

A detector system is preferably adapted to detect incident radiation in spectroscopically resolved manner in plural separate energy bands in the sense that it is adapted to differentiate incident radiation simultaneously into plural separate energy bands and preferably at least three such energy bands across the expected detection spectrum. For example, the detector system exhibits a spectroscopically variable response across at least a part of the expected detection spectrum allowing such simultaneous differentiation of incident radiation into a plurality of differentiated energy bands. Preferably incident radiation data is resolved spectroscopically between at least three energy bands simultaneously.

A suitable detector for implementation of the invention may comprise a dual energy detector adapted to resolve incident radiation into two energy bands or a multispectral detector adapted to resolve incident radiation into three or more energy bands. A dual energy detector may be a sandwich type scintillator detector. Additionally or alternatively a detector may comprise a material inherently as a direct material property into plural energy bands and for example into at least three energy bands.

A suitable detector for implementation of the invention comprises one or more detector elements of a semiconductor material adapted for high energy physics applications, such as a material able to act as a detector for high energy radiation, and for example high energy electromagnetic radiation such as x-rays or gamma rays, or subatomic particle radiation. The resultant detector element comprises at least one layer of such material and is thus a device adapted for high energy physics applications, and for example a detector for high energy radiation such as x-rays or gamma rays, or subatomic particle radiation.

In accordance with the invention, collected data is resolved spectroscopically across at least two and preferably at least three and for example many energy bands within the spectrum of the source. The semiconductor material of at least one of the detector elements is preferably a material adapted to exhibit a spectroscopically variable response across at least a substantial part of the intended radiation spectrum in use. In particular a semiconductor material is used that exhibits inherently as a direct material property a direct variable electrical and for example photoelectric response to different parts of the radiation spectrum in use.

In a preferred embodiment the semiconductor material is formed as a bulk crystal, and for example as a bulk single crystal (where bulk crystal in this context indicates a thickness of at least 500 µm, and preferably of at least 1 mm).

In a preferred embodiment the semiconductor material may be selected from Group II-VI semiconductors and in particular may be selected from cadmium telluride, cadmium zinc telluride (CZT), cadmium manganese telluride (CMT), and alloys thereof, and for example, save for incidental impurities, consists essentially of crystalline $Cd_{1-(a+b)}Mn_aZn_b Te$ where $a+b<1$ and a and/or b may be zero. A detector may also have other detector elements of other materials for additional functionality.

The invention in a further aspect comprises a computer program product, for example carried on one or more computer readable tangible storage media and/or programmed upon a suitable programmable computer, for assessing the threat status of a target item scanned in a security scanner, the program product comprising machine readable instructions to perform when executed the steps of:

receiving from a a radiation scanning system to derive a spatially distributed and spectroscopically resolved measured dataset of the intensity of radiation emergent from the target item;

considering the spatially distributed and spectroscopically resolved dataset of transmitted radiation intensity to be nominally determined in accordance with a relationship:

$$[O] \cdot [\delta] = [\lambda]$$

where $\delta$ is a notional theoretical set of elements related to parameters inherent in the target item that characterise the scanning response of the target item, $\lambda$ is a system response matrix in space and energy comprising the spatially distributed and spectroscopically resolved radiation intensity response of the scanning dataset of transmitted radiation intensity, and O is a space and material derived operator, which projects vector $\delta$ on to different possible measurements of the scanning system response matrix $\lambda$;

numerically processing the measured dataset in order to derive a best fit solution of:

$$[\delta] = [O]^{-1} \cdot [\lambda]$$

using that derived solution to determine the threat status of the target item.

Preferred features of the further aspect will be understood by analogy with the first aspect.

An example method of implementation of the invention is illustrated with reference to the accompanying drawings, in which.

The invention is based on the principle of using high energy electromagnetic radiation such as x-rays γ-rays and to measure the transmittance properties of the object.

While computed tomography scanners utilising X-rays in this way and are an advanced technology, they are dependent on making a large compliment of precision sequential measurements (scans) in order to render the volume of an object so that it can be viewed and then be interpreted. This inevitably involves a large hardware and computing overhead and is ultimately limited to the resolution of the system, its calibration, the artefacts that are inherent to the tomography method and any interpretation subsequently applied. Whilst pattern recognition methods have a role in the automated interpretation of images captured in such away, they have played no role in determining if the captured data fitted a representative picture of the test item. What is proposed here is that only sufficient data is captured to validate a description of an item, to a particular level of confidence, rather than to reconstruct a high quality image for human or machine aided inspection and then being of no further use. The concept is thus to provide a reductionist methodology to the verification process.

The methodology project does by constructing the system response operator O which is a space and material derived operator that projects a vector $\delta$ on to different possible measurements of the scanning system response matrix $\lambda$, vector $\delta$ being defined as an appropriate set of stimuli elements related to parameters inherent in the target item that characterise the scanning response of the target item.

Figure 1:
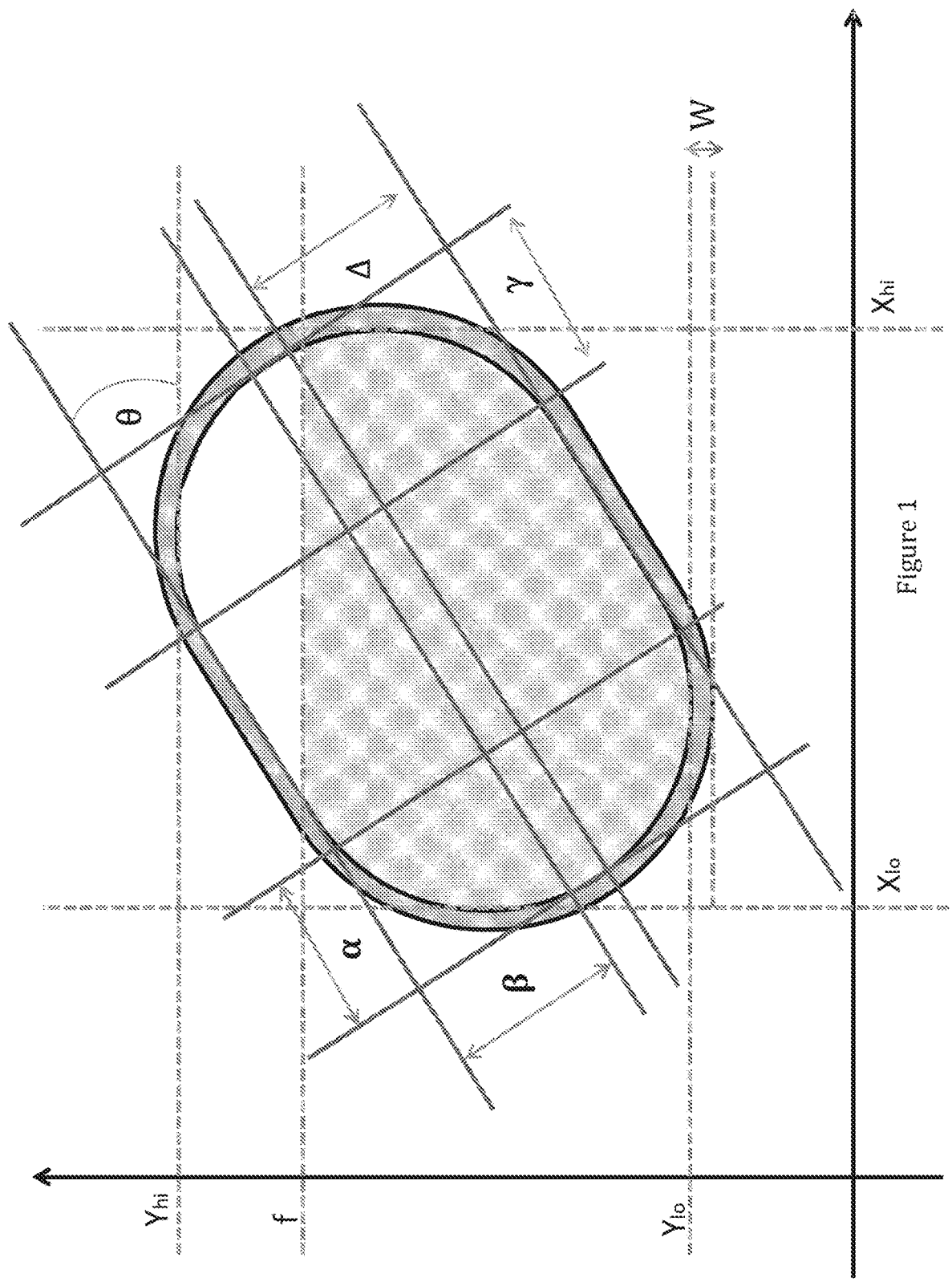
FIG. 1 is a representation of a bottle to be scanned in accordance with the principles of the invention.

This is as illustrated in FIG. 1 whereby bottle features such as where it is located in the scan region etc. are the stimuli to the system from which the measured response arises.

An example reductionist parameter set for a bottle representative of those to be found in hand-held baggage or aircraft cabin baggage might include those illustrated.

1. $Y_{hi}$, $Y_{lo}$, $X_{hi}$, $X_{lo}$—Bounding box of entity
2. W—thickness of wall material
3. α, β, γ, Δ—Radii of curvatures of corners of entity
4. Θ—Orientation of entity w.r.t. to data acquisition axis.
5. F—Fill level of contained "flowable" substance.

The above parameters are sufficient to verify that the scanned item is representative of a bottle. The bounding dimensions, the curvature of the corners, the thickness of any anticipated wall and level of fill reinforce the description of the entity. Translation of the object in a third axis can be used to dynamically reinforce and to evolve the representative model. The parameters used in satisfying the representative model of the bottle are also involved in representing the type of liquid contained within, as their measurement includes spectral components. This is achieved because a particular fill level of a liquid will modify the spectrum of the X-rays passing through that material which is representative of allowed or disallowed liquids in a bottle with those parameters.

Figure 2:
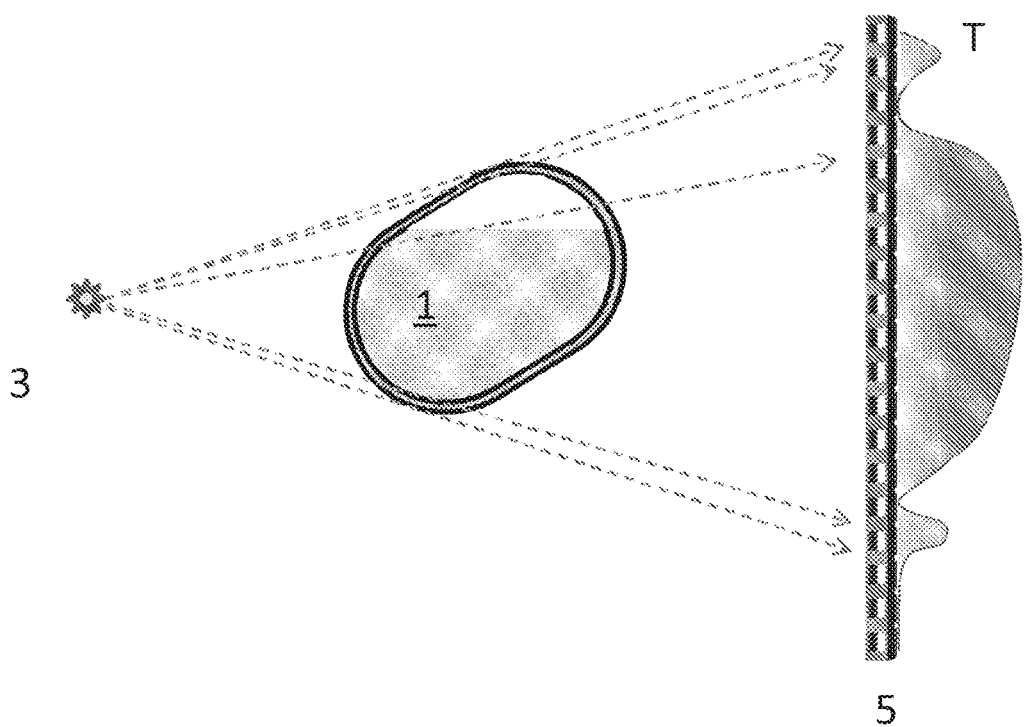
FIG. 2 is a schematic projection through a horizontal axis of the transmitted response.
Figure 3:
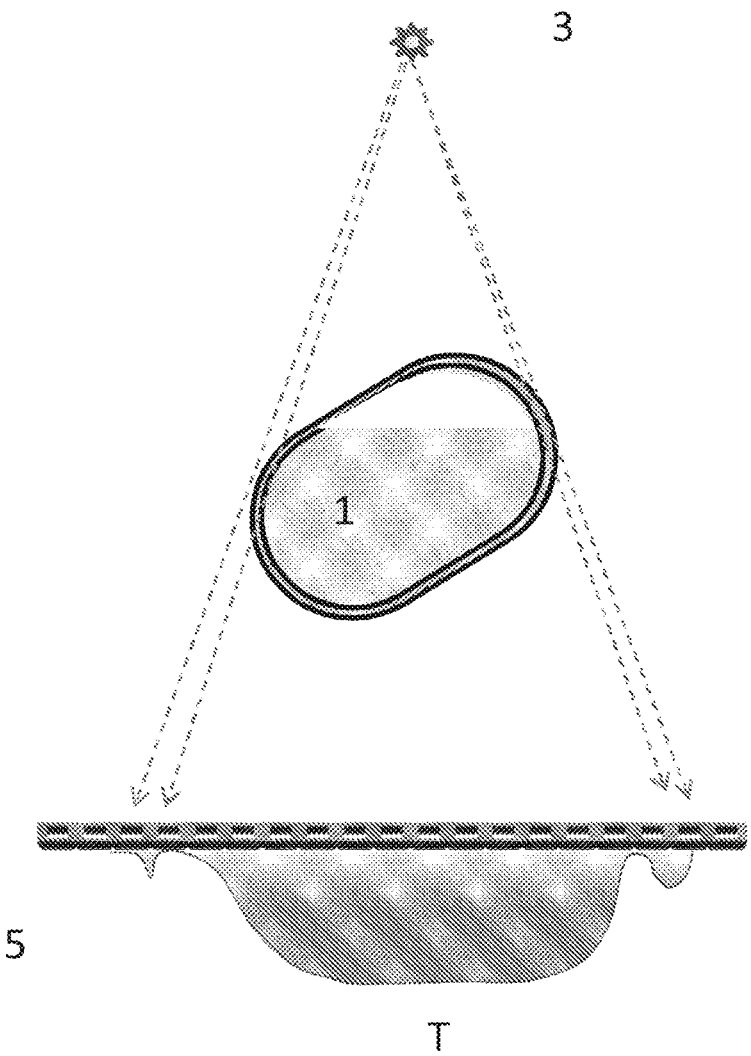
FIG. 3 is a schematic projection through a vertical axis of the transmitted response.
Figure 4:
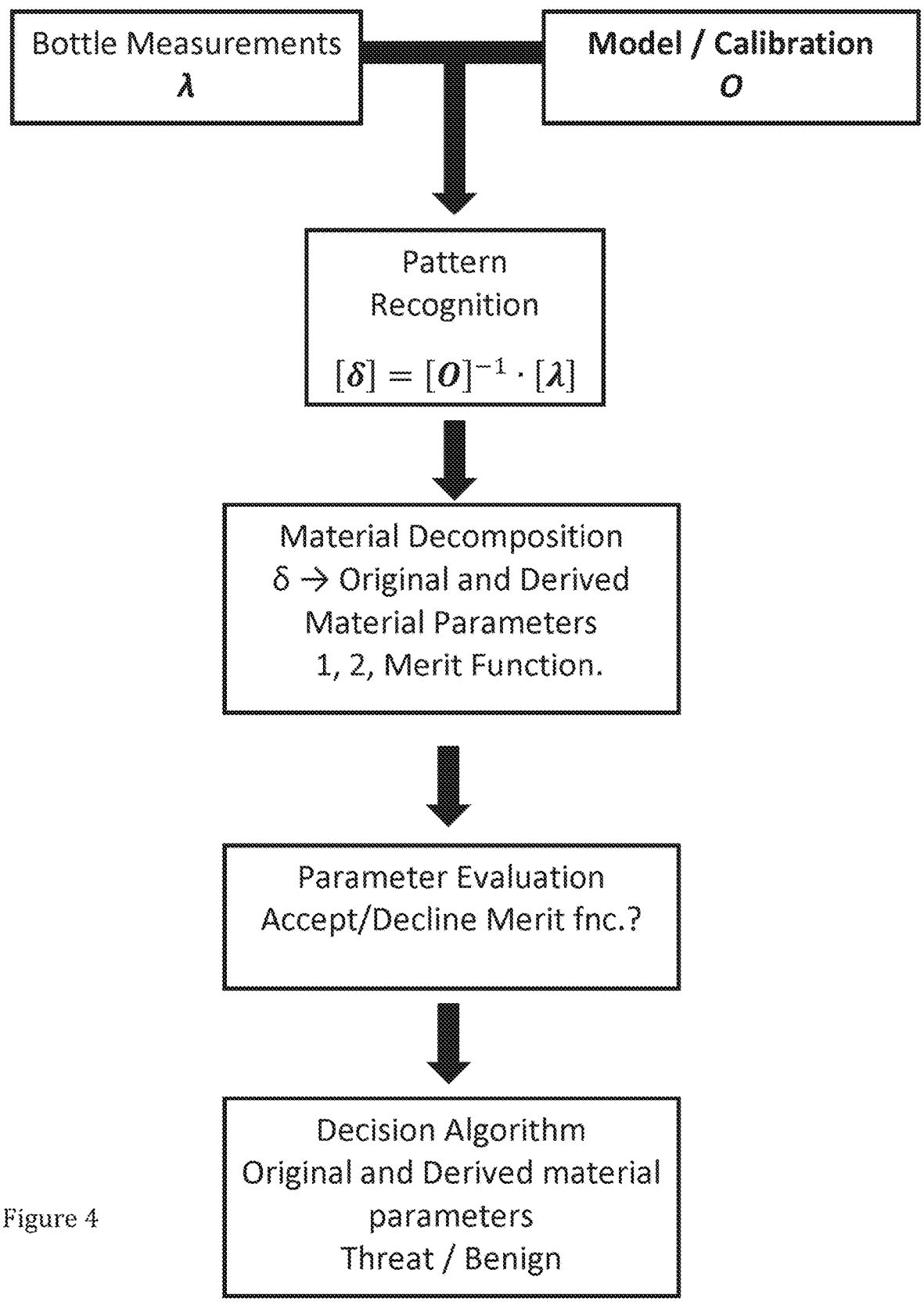
FIG. 4 show the invention methodology illustrating the dependencies of $\delta$, $\lambda$ and O.

The above process does not require a complete range of projection angles to test the bottle representation model. In this example the parameter set can be derived from just two projections and the spectral and spatial distributions they contain. These can be obtained from a single source detector pair in a transmission geometry with the test object being rotated a set angle between each measure. This angle can be specified but, in general, can for example be set to 90 degrees allowing an orthogonal projection pair. Such a data acquisition scenario is illustrated below in FIGS. 2 and 3, in each case with an object 1 held at an angle to the horizontal and irradiated by a source 3 and data measured at a pixellated energy-selective detector 5. A transmission profile T is shown.

The relationship of these stimuli to scanned features of the bottle is listed below in an example implementation of the method. The inverse of the response $O^{-1}$ is found so that the stimuli that solve the above equation are inferred from the measurements by generating the vector $\delta$ from $\lambda$ (for example by a nonlinear regression).

To construct O we compute, through Monte Carlo simulations as an example, to find how $\lambda$ varies as a consequence of X-ray interaction physics, applied through O, as the nature of the item is changed through modification of $\delta$. Provided that the rules that are applied are appropriate for the item as referenced by O and that the location and energy resolution of the elements of $\lambda$ can form separated or discriminating measures i.e. not significantly superimposed in space or energy, then stable vectors $\lambda$ are derived from $\delta$ in the presence of perturbations in their values.

In general, we will over-determine $\delta$ (its size) but in doing so we will realise that our system response measure $\lambda$ will be insensitive to certain elements in $\delta$ when tested against an ensemble of statistically varied stimuli arising from the plurality of test examples scanned. We also recognise that we need never be concerned with most of the derived elements of $\delta$ and that the value of a single element is often all that is need to ascertain for example if a particular scan is passed or failed.

By way of an example:
1. Vector λ has 512 components reflecting the measurements points (pixels), each with 5 spectral channels giving 2560 elements to the vector.
2. The values of the elements of λ arise from the operation of the system response O on the following parameters λ and are 17 in number:
   a. Bottle X-position
   b. Bottle Y-Position
   c. Bottle Extent in X
   d. Bottle Extent in Y
   e. Curvature of up to four corners (four parameters)
   f. Angle of role of irregular bottle around longitudinal axis
   g. Level of liquid fill
   h. Thickness of bottle wall
   i. Material type of liquid (two parameters)
   j. Material type of wall (two parameters)
   k. Bottle content is Benign or a Threat
   l. Scan is not compliant with a bottle description.

The method requires δ to be sufficient in size to support, to within error margins that are prescribed for overall system performance, a methodology that allows the most general description of the item to be interpreted as a threat level indicator. It does not require exact determination of given parameters, some of which may be harder to determine in any event.

It is found, however, that the system response is insensitive to exact determinations of curvatures (e), for example, but is particularly sensitive to liquid material type measures, thus is this respect δ has been over-determined in the system response function for the problem of threat liquid identification within the required outcomes. Conversely, we may require just the last two items reporting a success/fail scan result and a pass/fail threat status and which thus need to be most accurate.

X-rays are ideal for the screening of materials as they can be generated in energy ranges that can penetrate into to materials and also used to indicate the nature of any contained materials. This means that they simultaneously can be used the probe the distribution of materials in a concealed object item. Polychromatic bright sources of x-rays are readily generated and their properties measured, after passage through a specimen material, with detectors that can measure over a plethora of distinct or overlapping energy channels.

A CT imaging system, including those with a material type estimating functionality, would require a well understood and calibrated detector sub-system to generate the required radiometrically accurate images. From such images, regions of material would then be segmented and material type assigned to each segmented region. The success of such a process depends ultimately on the quality and resolution of the measurements that can be made throughout the spatial and energy domains.

By contrast, the verification procedure of the invention would not need to accurately render images as if for human inspection and thus can be essentially agnostic to the particular properties of the source, be it x-ray or γ-ray derived, the noise processes that come in to play, the detector systems and the spatial domain data is gathered, provided that it is sufficient to validate the object item as being representative of the type of object expected to a required degree. One might envisage that an image that is polluted with noise could well we unrecognisable, due to poor edge definition for example but would still be compliant with, or not preclude a bottle representation from which content properties could be elucidated. This reason this approach becomes advantageous is that all measured values have to be consistent to a representation of the object item, rather than a subset only being used to define an edge, for example.

The invention thus provides a method which alleviates the necessity of scanning a specimen with high detail, as would be required in a conventional imaging system, while being capable of verifying whether the contents of a container pose a potential threat or otherwise. A probe involving penetrating radiation, such as X-ray or γ-ray radiations, is used to determine that the projection data acquired from the specimen satisfies a minimum set of constraints that are representative of the anticipated class of object; be it a single container or multiple containers along with any contents. Threats might be, for example, precursor liquids required to make explosive compounds, that have been concealed in innocuous bottles so as to be taken on to aircraft as hand baggage.

The method is quite general, being applicable to a number of circumstances pertinent to the security industry. Examples include the determination whether contained liquids pose a threat from explosion or whether other such items; laptop computers for example, are representative specimens or whether they have become modified to incorporate threat materials.

FIG. 1 shows that a container of a generic type can be represented by a few parameters from which the item's shape may be inferred. This then can be achieved without the overhead of scanning in sufficient detail as to form a high definition image that would be suitable for region segmentation through contrast or texture.

The proposed system has the advantage, apart from being reductionist of being hardware agnostic. Provided that the data acquired is as expected when considering the nature of the data acquisition geometry then the representation of the item type and inferences about its contents can be deduced. Clearly, as the quality of the acquired data is degraded, through noise processes for example, the certainty that an item meets the requirements of the representative description decreases. The decision, however, is based upon the inferences of the entire data set, which at a pixel level may be imprecise but when considered over the entire model will be remain a powerful predictor of nature of the item and the conclusion drawn about its contents.

The invention claimed is:

1. An improved method for inspection of a contained flowable material using high-energy radiation to irradiate the contained flowable material and an energy detector to measure a transmission response of the high-energy radiation, the improved method comprising the steps of:
   determining a pre-determined set of elements for a vector δ, wherein each element of the set of elements is representative of a different feature inherent in a target item container;
   constructing, via a computer system, a representative operator O (space, material) for a radiation scanning system for the pre-determined set of elements defined for the vector δ;
   scanning, via the radiation scanning system, a target item container comprising a homogenous fluid;
   detecting, via the radiation scanning system, radiation incident at a first radiation detector system and a second radiation detector system to create an initial dataset;
   resolving, via a computer in communication with the radiation scanning system, the initial dataset spectroscopically into a plurality of energy bins to create a resolved dataset describing an intensity of radiation emergent from the target item container;

analyzing, via the computer in communication with the radiation scanning system, the resolved dataset of transmitted radiation intensity using the relationship $[O]\cdot[\delta]=[\lambda]$ wherein $\lambda$ is a system response vector in space and energy comprising a spatially distributed and spectroscopically resolved radiation intensity response produced by the target item container, O is a space and material derived operator that projects vector $\delta$ on to the system response vector $\lambda$, and $\delta$ is a column vector comprising a notional theoretical set of elements related to the different features inherent in the target item container that characterize a scanning response of the target item container; and numerically processing, in a single step, the analyzed resolved dataset to derive a best fit solution of $[\delta]=[O]^{-1}\cdot[\lambda]$ and using the best fit solution to determine an improved threat status of the homogenous fluid.

2. The improved method in accordance with claim 1, wherein the step of constructing a representative operator O (space,material) for the radiation scanning system comprises an experimental calibration with a standard object of known features.

3. The improved method in accordance with claim 1, wherein the step of constructing a representative operator O (space,material) for the radiation scanning system comprises a numerical calibration against theoretical standard feature using a Monte Carlo simulation.

4. The improved method in accordance with claim 1, wherein a spectroscopically resolved measured dataset of the intensity of radiation emergent from the target item container is obtained by collecting data of photon counts by use of an energy selective detection system capable of collecting photon count data in an energy discriminating manner and distributing the collected photon count data into a plurality of energy bins representative of an overall transmitted intensity in each of a plurality of predefined energy bands.

5. The improved method in accordance with claim 1, wherein a spectroscopically resolved measured dataset of the intensity of radiation emergent from the target item container is obtained via the radiation scanning system, the radiation scanning system further comprising a plurality of detector elements comprised of a semiconductor material adapted to exhibit as a direct material property of the semiconductor material a direct variable photoelectric response to different parts of the radiation spectrum.

6. The improved method in accordance with claim 5, wherein the semiconductor material is selected from cadmium telluride, cadmium zinc telluride (CZT), cadmium manganese telluride (CMT), and alloys thereof.

7. The improved method in accordance with claim 1, wherein the spatially distributed and spectroscopically resolved dataset is processed by the computer in communication with the radiation scanning system by fitting the resolved dataset numerically to a whole target response relationship.

8. The improved method of claim 1, wherein the different features of the target item container include two or more of a wall material thickness, a radius of curvature of a corner, an orientation with respect to a data acquisition axis, and a fill level of the homogeneous fluid.

9. An improved apparatus for scanning a homogenous fluid using high-energy radiation to irradiate the homogenous fluid and an energy detector to measure a transmission response of the high-energy radiation, the improved apparatus comprising:

a radiation scanning system comprising:
at least one radiation source; and
at least one radiation detector system spaced from the at least one radiation source to define a scanning zone, the at least one radiation detector system being adapted to derive a spatially distributed and spectroscopically resolved measured dataset of an intensity of radiation emergent from the homogenous fluid within the scanning zone;

a computer in communication with the radiation scanning system, the computer configured to:
construct a representative operator O (space, material) for a radiation scanning system for a pre-determined set of elements defined for a vector $\delta$, wherein each element of the pre-determined set of elements is representative of a different feature inherent in a target item container;
process numerically, in a single step, the spatially distributed and spectroscopically resolved measured dataset in order to derive a best-fit solution of $[\delta]=[O]^{-1}\cdot[\lambda]$; and
to use the derived best-fit solution to determine an improved threat status of the homogenous fluid; and
wherein $\delta$ is a column vector comprising a notional theoretical set of elements related to the different features inherent in a target item container that characterizes a scanning response of the target item container, $\lambda$ is a system response vector in space and energy comprising the spatially distributed and spectroscopically resolved radiation intensity response produced by the target item container, and O is a space and material derived operator that projects vector $\delta$ onto the system response vector $\lambda$.

10. The improved apparatus in accordance with claim 9, wherein:
the at least one radiation source comprises a first radiation source with a first scanning direction and a second radiation source with a second scanning direction;
the at least one radiation detector system comprises a first radiation detector system and a second radiation detector system;
the second scanning direction being at an angle relative to the first scanning direction;
at least one of the first and second radiation detector systems is adapted to resolve incident radiation spectroscopically into a plurality of energy bins; and
further comprising a means to cause the target item container to move relative to and through the scanning zone in a movement direction, the first and second scanning directions being orthogonal to the movement direction.

11. The improved apparatus in accordance with claim 10, wherein the second scanning direction is orthogonal to the first scanning direction.

12. The improved apparatus in accordance with claim 10, wherein each of the first and second radiation sources is adapted to generate a two dimensional curtain beam and wherein each of the first and second radiation detector systems in a linear array detector.

13. The improved apparatus in accordance with claim 9, comprising an energy selective detection system capable of collecting photon count data in an energy discriminating manner and distributing the collected photon count data into a plurality of energy bins representative of an overall transmitted intensity in each of a plurality of predefined energy bands.

14. The improved apparatus in accordance with claim 13, wherein the radiation detection system comprises a plurality of detector elements comprising a semiconductor material adapted to exhibit as a direct material property of the semiconductor material a direct variable photoelectric response to different parts of the radiation spectrum.

15. The improved apparatus in accordance with claim 14, wherein the semiconductor material is selected from cadmium telluride, cadmium zinc telluride (CZT), cadmium manganese telluride (CMT), and alloys thereof.

16. The improved apparatus in accordance with claim 9, wherein the spatially distributed and spectroscopically resolved dataset is processed by the computer by fitting the spatially distributed and spectroscopically resolved dataset numerically to a whole target response relationship.

\* \* \* \* \*